US010956179B1

(12) United States Patent
Moturu et al.

(10) Patent No.: US 10,956,179 B1
(45) Date of Patent: Mar. 23, 2021

(54) THIRD PARTY INTEGRATION OF PLUGINS AND WIDGETS

(71) Applicant: INTUIT INC., Mountain View, CA (US)

(72) Inventors: Tapasvi Moturu, Sunnyvale, CA (US); Jessica Yen Yen Sperling, Mountain View, CA (US); Anshu Verma, Mountain View, CA (US); Muzaffar H. Malik, Mountain View, CA (US); Carlos Ambrozak, Mountain View, CA (US)

(73) Assignee: INTUIT, INC., Mountain View, CA (US)

( * ) Notice: Subject to any disclaimer, the term of this patent is extended or adjusted under 35 U.S.C. 154(b) by 99 days.

(21) Appl. No.: 15/852,566

(22) Filed: Dec. 22, 2017

(51) Int. Cl.
  *G06F 9/445* (2018.01)
  *G06F 3/0481* (2013.01)
  *G06F 9/54* (2006.01)

(52) U.S. Cl.
  CPC ...... *G06F 9/44526* (2013.01); *G06F 3/04817* (2013.01); *G06F 9/54* (2013.01); *G06F 2209/461* (2013.01); *G06F 2209/482* (2013.01); *G06F 2209/545* (2013.01)

(58) Field of Classification Search
  None
  See application file for complete search history.

(56) References Cited

U.S. PATENT DOCUMENTS

| | | | |
|---|---|---|---|
| 6,871,348 B1* | 3/2005 | Cooper | G06F 9/451 719/310 |
| 8,244,277 B1* | 8/2012 | Cha | H04M 1/72566 455/456.3 |
| 2009/0249282 A1* | 10/2009 | Meijer | G06F 8/36 717/104 |
| 2009/0249359 A1* | 10/2009 | Caunter | G06F 9/454 719/315 |
| 2010/0228963 A1* | 9/2010 | Kassab | G06Q 30/02 713/150 |
| 2012/0198457 A1* | 8/2012 | Leonelli | G06F 8/34 718/102 |
| 2014/0089185 A1* | 3/2014 | Desai | G06Q 40/02 705/41 |

(Continued)

*Primary Examiner* — Tuan C Dao
*Assistant Examiner* — William C Wood
(74) *Attorney, Agent, or Firm* — Patterson & Sheridan, LLC

(57) ABSTRACT

This disclosure relates to third-party integration of native and platform-agnostic based software components into a third-party application. An exemplary method generally includes receiving, a workflow definition specifying one or more widgets to be loaded into a runtime environment, the one or more widgets comprising at least the first cross-platform widget. A runtime environment is instantiated for the first cross-platform widget. The runtime environment includes a bridge interface for facilitating communications between each widget in the one or more widgets and a second application. The first cross-platform widget is loaded into the runtime environment. When a communication between the first cross-platform widget and the second application is received, the communication is processed through the bridge interface. The bridge interface invokes an event at one or more of the first cross-platform widget or the second application based on the communication.

17 Claims, 7 Drawing Sheets

(56) References Cited

U.S. PATENT DOCUMENTS

| | | | | |
|---|---|---|---|---|
| 2014/0208309 A1* | 7/2014 | Wu | ................ | G06F 9/44505 |
| | | | | 717/174 |
| 2014/0282014 A1* | 9/2014 | Lee | ................ | G06F 3/048 |
| | | | | 715/733 |

* cited by examiner

THIRD PARTY INTEGRATION OF PLUGINS AND WIDGETS

BACKGROUND

Field

Aspects of the present disclosure generally relate to techniques for third-party integration of plugins and widgets, and more specifically to implementing a consistent user experience across different platforms.

Description of the Related Art

Software applications can be consumed on a variety of devices, including desktop computers, laptop computers, tablet computers, smartphones, and the like. These applications may be native applications (e.g., applications for which an executable file is built specifically for that platform), web components hosted in a native application, or web applications in which data provided by a user is processed remotely. In many cases, building an application for different platforms entails the use of platform-specific code monoliths, which include code for generating application logic and a user interface tightly bound to the application logic. In some cases, applications targeting a particular platform (e.g., a device type, an operating system, or both) do not work on variations of that platform (e.g., a common operating system spanning multiple smartphone models), resulting in developers having to write application logic that accommodates different devices on the common platform.

As the number of applications targeting different platforms and applications supporting variations on a common workflow increases, the difficulty in providing a different version of the same application and user experience for each device increases. For example, a set of tax preparation applications perform the same general task of preparing a user's taxes, but a variety of discrete software artifacts may exist for variations in the workflow (e.g., one artifact may execute a workflow for preparing a simple tax return for a taxpayer in the United States, another artifact may execute a workflow for preparing a complex tax return for a taxpayer in the United States, another artifact may execute a workflow for preparing a simple tax return in Canada, and the like). While these applications may perform the same general task (e.g., of tax preparation) and may share a significant amount of code, each application may nevertheless implement custom code dedicated to performing a task according to each platform.

Because these applications may implement a combination of custom and shared application logic that is bound to the user interface of the application, building and maintaining these applications generally requires large amounts of development time. Similarly, to maintain a consistent user experience across all platforms, applications, and variations of a workflow requires additional amounts of development time and resources. For example, if a common code component is modified, a developer may need to verify that the modification does not adversely affect the operation of applications that use the common code component (e.g., render custom code components in a specific application unusable or otherwise modify the functionality of the custom code components). Further, as new variants of a workflow are identified, additional applications may be built, which adds to the universe of applications to be maintained.

Therefore, there is a need for systems that reduce the amount of time needed to develop, update, and deploy applications across different platforms.

SUMMARY

One embodiment of the present disclosure includes a system comprising a processor and a memory. The memory comprises executable instructions, which, when executed by the processor, cause the system to receive, from an application server, a workflow definition specifying one or more widgets to be loaded into a runtime environment, the one or more widgets comprising at least a first cross-platform widget. The memory further comprises instructions which, when executed by the processor, cause the system to obtain, from the application server, the first cross-platform widget. The memory further comprises instructions which, when executed by the processor, cause the system to instantiate the runtime environment for the first cross-platform widget, the runtime environment including a bridge interface for facilitating communications between each widget in the one or more widgets and the second application. The memory further comprises instructions which, when executed by the processor, cause the system to load the first cross-platform widget into the runtime environment. The memory further comprises instructions which, when executed by the processor, cause the system to process, through the bridge interface, a communication between the first cross-platform widget and the second application. The memory further comprises instructions which, when executed by the processor, cause the system to invoke an event at one or more of the first cross-platform widget or the second application based on the communication.

Another embodiment provides a computer-readable storage medium having instructions, which, when executed on a processor, perform an operation for executing a first cross-platform widget for a first application within a second application. The operation generally includes receiving, from an application server, a workflow definition specifying one or more widgets to be loaded into a runtime environment, the one or more widgets comprising at least the first cross-platform widget. The operation also includes obtaining, from the application server, the first cross-platform widget. The operation also includes instantiating the runtime environment for the first cross-platform widget, the runtime environment including a bridge interface for facilitating communications between each widget in the one or more widgets and the second application. The operation also includes loading the first cross-platform widget into the runtime environment. The operation also includes processing, through the bridge interface, a communication between the first cross-platform widget and the second application. The operation also includes invoking an event at one or more of the first cross-platform widget or the second application based on the communication.

Still another embodiment of the present disclosure includes a method for executing a first cross-platform widget for a first application within a second application. The method generally includes receiving, from an application server, a workflow definition specifying one or more widgets to be loaded into a runtime environment, the one or more widgets comprising at least the first cross-platform widget. The method also includes obtaining, from the application server, the first cross-platform widget. The method also includes instantiating the runtime environment for the first cross-platform widget, the runtime environment including a bridge interface for facilitating communications between each widget in the one or more widgets and the second application. The method also includes loading the first cross-platform widget into the runtime environment. The method also includes processing, through the bridge interface, a communication between the first cross-platform widget and the second application. The method also includes invoking an event at one or more of the first cross-platform widget or the second application based on the communication.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. Note, however, that the appended drawings illustrate only exemplary embodiments and are therefore not to be considered limiting of the scope of the disclosure, for the disclosure may admit to other equally effective embodiments.

DETAILED DESCRIPTION

Figure 1:
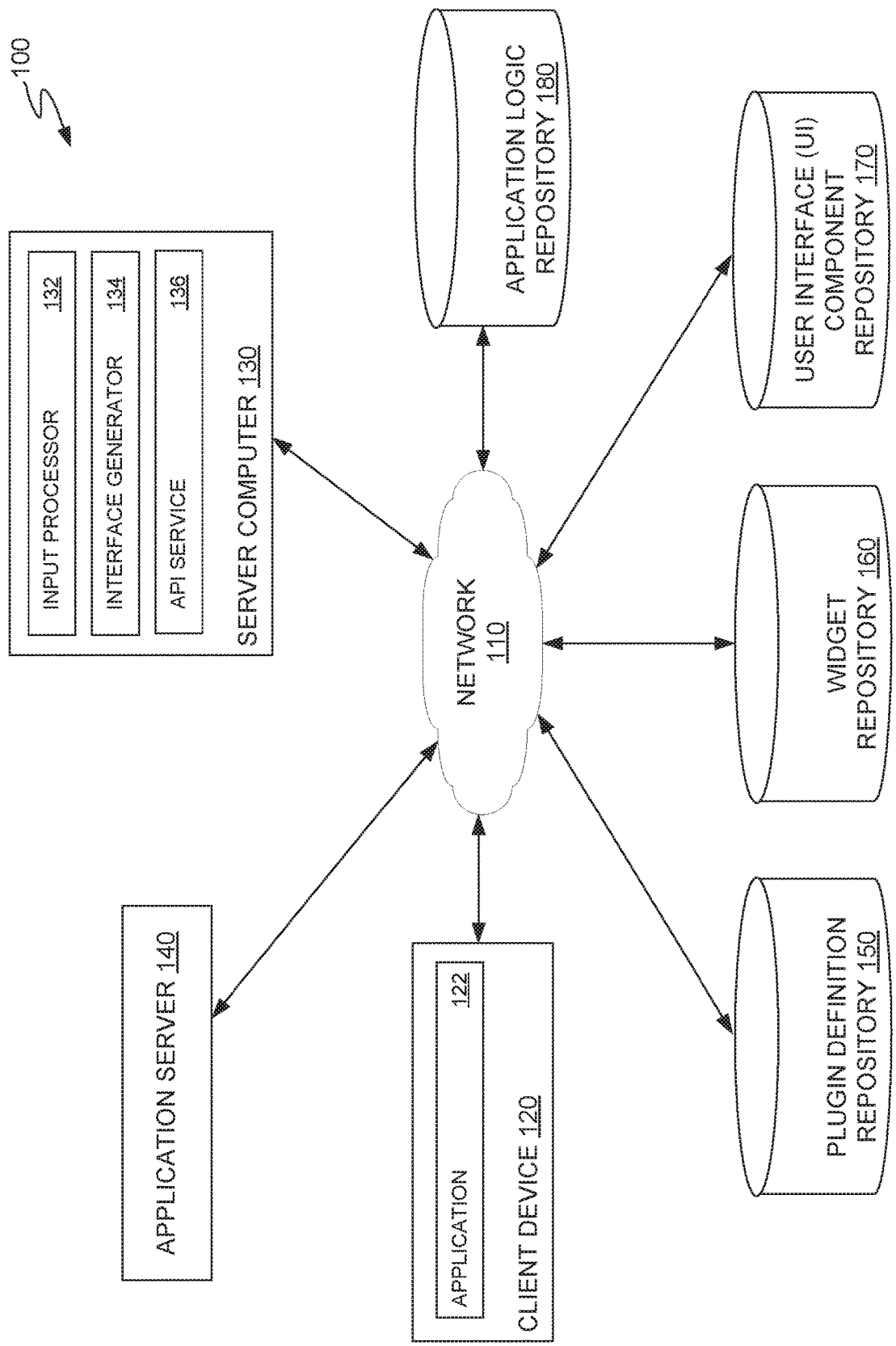
FIG. 1 illustrates an exemplary computing system in which user interfaces are dynamically generated and deployed to client devices executing a cross-platform application, according to one embodiment.

To reduce the amount of code to be maintained in a universe of related applications, software applications may be developed using a "write once, run anywhere" development paradigm. Typically, write once, run anywhere paradigms include an interpreter used to execute program code compiled into a common language, and allow for the generation and deployment of a single software artifact across different platforms. As used herein, a platform may include a device type (e.g., desktop computer, laptop computer, tablet computer, smartphone, and the like), an operating system (OS) type (e.g., an OS executing on a device), or both, etc. For example, a platform may include a particular device type regardless of OS executing on the device, a particular OS regardless of device type, or may be dependent on both the device type and OS. That is, one OS may span multiple device types (e.g. different model smartphones) and one device type may span multiple OSes (e.g., a single deployed model of a smartphone running different versions of an OS). In some instances, the platform may be further defined by attributes of the device type, such as screen formats (e.g., screen size, screen resolution, etc.) and input capabilities (e.g., multi-touch sensitive displays, pressure sensitive displays, and others). Thus, a platform may be defined as a set of device types, operating systems, and/or capabilities on which a particular software application may run.

Different software artifacts including user interface components may need to be generated for different variations of a workflow and/or different types of platforms due to usability differences between the different types of devices (e.g., different user interfaces for desktop, web, and mobile applications, different capabilities of different types of devices, and the like). Different software artifacts may also need to be generated due to physical differences between types of devices (e.g., screen size, screen resolution, etc.) and differences in touch capabilities (e.g., determining a firmness of a touch) and gesture capabilities (i.e., what types of gestures are recognized by the device).

Because different software artifacts are generated for different variations of a workflow, developers may still need to debug a multitude of different software artifacts when changes are propagated to shared portions of application code. Further, the different software artifacts developed for variations in a workflow are typically tightly bound to application logic. This may cause developers to spend significant time to ensure that changes to application logic do not alter the user interface or user experience in an unexpected manner and to ensure that changes to the user interface do not alter or break the expected functionality of the underlying application logic.

Aspects of the present disclosure generally provide a bridge interface of a shell that allows communication between applications and modular user interface components loaded into the shell. Specifically, the bridge interface provides a consistent communication channel and protocol between a native application and both native and non-native widgets. For example, a non-native widget may not be able to communicate with a native application due to differences in communication protocols. The bridge provides a communication interface that may listen for an event transmitted from the application and then transmit that event to the application.

The shell may be loaded into the application and provide a runtime container in which modular widgets can execute. For example, the shell may provide a common runtime environment in which all non-native widgets execute within a native environment. The shell also provides the widgets with common services, such as activity logging, analytics, context tracking, and the like. The shell may expose one or more Application Programming Interfaces (APIs), including a widget API to be used by applications for loading widgets into or unloading widgets from the shell and a sandbox API for widgets to access the common services. The widget API may be defined by the shell and may be a common API for all widgets, whether native or non-native. Thus, the widget API provides a centralized API that can be used by different applications executing on different platforms.

The shell may also centralize common services for all widgets. Native and non-native widgets executing within a native application may provide a consistent user experience for an application regardless of the platform on which the application executes. Thus, the combination of native and non-native widgets may allow the application to be executed on different platforms (e.g., a cross-platform application). For example, when a user interface of an application comprises cross-platform widgets that are not tied to the application logic, the same user interface can be rendered on various platforms. Thus, the user experience is consistent between platforms.

As disclosed herein, the bridge interface may improve the operation of a client device implementing the shell and bridge interface in several aspects. First, the bridge interface and modular user interface components improve the speed and performance of the client device by dividing an application workflow into manageable workflow steps. Thus, a system, in which a shell and a bridge interface are executing, may perform functions of the workflow with fewer computing resources expended. As a benefit of expending fewer resources, the functions of the workflow may be performed more quickly. Further, an amount of processing resources and memory necessary to render a user interface may be decreased by virtue of the modular user interface components and the common bridge interface. For these reasons and others, a device on which a shell and bridge are executing may perform faster and with fewer processing and memory resources necessary. Similarly, the modular user interface components themselves will perform better than known application programming techniques for the reasons described above.

FIG. 1 illustrates an exemplary computing system. As illustrated, computing system 100 includes a client device 120, a server computer 130, an application server 140, a plugin definition repository 150, a widget repository 160, a user interface (UI) component repository 170, and an application logic repository 180, connected via network 110.

Client device 120 may be any sort of computing device, such as a desktop computer, a laptop computer, a tablet computer, a smartphone, or the like. Client device 120 may execute an application 122 that communicates with the server computer 130 to obtain a user interface for the application 122 and provide data to the server computer 130 for processing. In one example, the application 122 executes a multi-step workflow where each step of the workflow is displayed as a set of interface components that are built dynamically based, at least in part, on the platform and the current state of the application (e.g., a progress state of a workflow).

A workflow definition may comprise one or more workflow steps. Each workflow step may define a discrete task that can be completed by executing one or more functions and may reference one or more widgets that can be loaded into the shell and invoked to complete the one or more functions. Once a given workflow step is completed, the workflow may advance to the next workflow step in the workflow definition.

For example, in some embodiments, a workflow definition may comprise steps to complete a tax preparation workflow. The tax preparation workflow may include one or more user interface components that can provide a form input interface for a user to manually add form data. Similarly, the tax preparation workflow may include one or more user interface components that allow the application 122 to obtain and process data from a camera on the client device 120.

In some cases, a workflow definition may include native user interface components, which may be specific to a platform, as well as cross-platform user interface components (e.g., web-based components), which may be shared across different platforms and allow a common (i.e., cross-platform) user interface to be generated across multiple platforms. In one embodiment, the collection of user interface components may be selected based on a particular platform or an application state (e.g., a progress state of a workflow). For example, a workflow step definition for a step of a tax preparation workflow could include a combination of web-based user interface components, which may, for example, allow a user to enter form data, as well as native user interface components, which may, for example, allow the application 122 to capture and process data from a peripheral at the client device 120, such as a camera. The web-based and native user interface components may be stored in the user interface component repository 170. In another portion of the tax preparation workflow, for example where a user is asked to identify tax deductions the user is entitled to claim, the workflow definition may identify a number of web-based user interface components from the user interface component repository 170 to render in the application 122.

In some embodiments, native code components may also be included in a workflow definition to take advantage of functionality exposed by the operating system executing on the client device 120. For example, native code components may be referenced in a workflow definition to generate notifications related to the application 122. In other examples, native code components can be referenced in a workflow definition to allow users to provide voice data into the application 122, engage in video chats with other users or with live support representatives using the application 122, etc. Further, native code components may be referenced in a workflow definition to enable a user to take advantage of input methods and technologies particular to a platform, such as a multi-touch and/or pressure-sensitive touchscreen display, etc.

As a user interacts with the application 122, the application 122 may transmit user-provided data and context information to the application server 140. The application server 140 may transmit the user-provided data and context information to the server computer 130 for processing. The context information may include device information (e.g., the type of device, the operating system executing on the device, capabilities of the device, and the like) and application state information. The application state information may include the current version of a workflow definition (e.g., widget definitions and/or updated rules for processing user-provided data) for a specific step of a workflow cached at the client device 120, the current step of the workflow executing in the application 122 (i.e., a progress state of the workflow), and a variation of the application a user is executing (e.g., the version of the application specific to a geographical region in which the client device 120 is located). When the application 122 submits data to the application server 140, the application 122 may invoke a specific function in the workflow definition according to the data elements specified as inputs to the specific function. In response to transmitting data to the application server 140, the application 122 may receive a new workflow definition identifying the present step of the workflow, the user interface components to be displayed on the client device 120, and the function(s) to be invoked upon completion of data entry for the present step of the workflow.

The application server 140 may access and obtain data stored by a third party and related to the platform or a user of the client device 120. For example, if the third party is a financial institution, the application server 140 may access data related to financial accounts of the user. If the third party is an employer of the user, the application server 140 may access data identifying the user (e.g., name, position, location, etc.), data related to the employment of the user (e.g., length of employment, salary, etc.), or documents generated by the third party and related to the user (e.g., W2, performance evaluations, etc.).

The data obtained by the application server 140 may be limited to data for which the user is authenticated. The application 122 may transmit authentication information of the user to the application server 140. For example, a user interface component displayed on the client device 120 may request the user to input authentication information (e.g., a username and password) into the application 122. The application 122 may then transmit the authentication information to the application server 140. Upon receiving requested data from the application server 140, the application 122 may render the received data as part of the user interface displayed on the client device 120 or use the received data in executing the current workflow.

The application server 140 may receive user-input data from the client device 120. The user input may be transmitted to the server computer 130 to generate a workflow definition for the client device to display user interface components for the next step of a workflow based on the received user input. As illustrated in FIG. 1, the server computer 130 includes an input processor 132, an interface generator 134, and an API service 136. While the server computer 130 is depicted as a single server in FIG. 1, in other embodiments the functions of the server computer 130 (e.g., functions of the input processor 132, the interface generator 134, and the API service 136) may be implemented on more than one server.

The input processor 132 may receive user-provided data from the application 122 (e.g., form input), an indication of the next step to be performed in a workflow executing in the application 122, and other context information from the client device 120 for processing. The input processor 132 generally invokes one or more functions exposed by the API service 136 and identified in the user-provided data. The input processor 132 may examine any other data provided by the client device 120 to generate a workflow definition for the client device 120 including one or more plugins from the plugin definition repository 150.

A plugin may include a collection of widgets that the client device 120 and/or the server computer 130 can use to represent a discrete task. A plugin may reference one or more functions defined in the API service 136 that are invoked to complete the discrete task. Each widget may define a collection of user interface components to render on the client device 120 to complete a workflow step or to enable a user to input data into the application 122. The plugin may identify included widgets, functions the plugin can invoke in the API service 136, permissions associated with the plugin, behaviors of the plugin, intended interactions with other parts of a service, such as API service 136, and the like. Each plugin may be versioned as the widget definitions and/or application logic associated with a plugin is updated.

In some cases, the input processor 132 may receive information about the current version of a workflow definition associated with a plugin cached at the client device 120. If the input processor 132 determines that the current version of the plugin in the plugin definition repository 150 matches the version of the plugin cached at the client device 120, the input processor 132 can indicate to the client device 120 to render the user interface associated with the next step in the workflow using the cached version. Because the cached version of the workflow definition at client device 120 is the most current version of the workflow definition, input processor 132 need not invoke the interface generator 134 to generate an updated workflow definition for the user interface associated with the next step of the workflow to be displayed on the client device 120.

If, however, the input processor 132 determines that the current version of the workflow definition cached at the client device 120 is outdated or that no workflow definition for the requested step of the workflow exists at the client device 120, input processor can invoke the interface generator 134 to generate the workflow definition for the requested step of the workflow. In some cases, the input processor 132 may invoke the generation of a workflow definition by the interface generator 134 with information identifying the requested step of the workflow and device-specific information (e.g., device type, operating system, whether the application is a native application or is executing in a web-based shell, and other device-specific information).

The interface generator 134 may generate a workflow definition using the information received from the client device 120 and transmit the generated workflow definition to the client device 120 or application server 140 for rendering and execution by the application 122. To generate the workflow definition, the interface generator 134 uses the information identifying the requested step of the workflow and the context information to identify and select one or more plugins for populating the workflow definition. The interface generator 134 may populate the workflow definition according to a defined order in which the user interface components of the widgets associated with the one or more plugins are to be rendered on the client device 120. Thereafter, the interface generator 134 may transmit the workflow definition to the client device 120. The interface generator 134 may generate a workflow definition referencing non-native user interface components, native user interface components, or a combination thereof. The workflow definition may additionally reference one or more functions that can be invoked by the generated user interface. These functions may commit data to one or more data stores associated with the application 122, transmit data to the server computer 130 for processing, or route user-provided data to one or more expert systems on the server computer 130 for analysis (e.g., to guide a user through a workflow).

Because the workflow definition references one or more functions that can be executed through the generated user interface, but generally does not include the code for executing the one or more functions, the server computer 130 allows for decoupling of the user interface and the application logic for performing a task. Thus, the client device 120 generally receives a workflow definition that is platform specific, i.e., customized for the client device 120 on which the application 122 is executing. The workflow definition interacts with underlying application logic that may be implemented as a single code base maintained independently from platform-specific code (e.g., stored in application logic repository 180). Common application components need not be duplicated, updated, and tested for platform-specific versions of the same application.

Application logic may need to be changed to support new variations of a workflow, to modify how data is processed at a specific step in a workflow, and the like. These changes in application logic generally do not affect the functionality of a generated user interface, and updated application logic may be executed by client devices without building discrete software artifacts with the updated application logic. For example, suppose that the application 122 is a tax preparation application executing on a client device 120 and that the user of the client device 120 is attempting to provide wage income data to the application 122. The interface generator 134 may identify multiple plugins that can be executed on the client device 120 to allow a user to import wage income data into the application 122.

For example, one plugin may allow a user to capture one or more images of a document (e.g., as still images or a live stream from a camera integrated into or otherwise connected to the client device 120) and provide the data extracted from the document to the API service 136. Because this plugin interfaces directly with device-specific capabilities, this plugin may include references to device-specific (i.e., native) logic and user interface components tied to image capture and data extraction. Meanwhile, another plugin may generate a form used to input data. The interface generator 134 may generate a workflow definition including references to both the image capture plugin (with the native code components needed to interact with the device-specific functionality) and the form entry plugin (with a form layout definition for the one or more data entry boxes to be displayed to the user) and transmit the workflow definition to the client device 120 for execution.

In another example, suppose that the application 122 is an accounting application executing on the client device 120 and that a user of the client device 120 is entering information from paper invoices into an accounts payable or accounts receivable account in the accounting application. The application 122 can reuse the image capture plugin discussed above. In conjunction with other plugins for extracting workflow-specific data from a captured image of a document, the application 122 can extract relevant data from the captured image and provide the relevant data to the server computer 130 hosting the API service 136 for performing accounting tasks.

Another benefit of decoupling the user interface and the application logic is the ability to allow a user to move between devices running an application (e.g., 122) while executing a workflow. For example, a user may begin a workflow (e.g., for tax preparation) on one device that receives a device-specific user interface (e.g., a smartphone) and later finish the workflow on another device, such as a desktop computer. Because the application logic is not tied to the particular platform, the application logic may be deployed dynamically to different types of devices through platform-specific user interfaces and enable a user to leverage the application logic in a more flexible fashion.

The application server 140 may host application logic for a specific application and an application programming interface (API) service 136 that allows the application 122 to invoke the functionality of the application hosted on the server computer 130. When the API service 136 receives a query from application server 140, the API service 136 can verify that the received query is valid. If the API service 136 determines that the received query is valid, the API service 136 invokes the function specified in the query. If the API service 136 determines that the query is invalid, the API service 136 may generate and send an error message to the application server 140.

The plugin definition repository 150 generally stores plugin definitions for specific tasks implemented in a workflow. A plugin definition may reference one or more widgets defined in the widget repository 160 and one or more functions exposed by the API service 136 and stored in the application logic repository 180. The widgets may define a layout of a user interface to be rendered on client device 120 and may include a plurality of user interface components. As discussed above, the widgets may include cross-platform (i.e., non-native) user interface components, native user interface components, or a combination cross-platform and native user interface components. Widgets that do not depend on platform-specific functionality may be defined using cross-platform user interface components, while widgets that implement device-specific functionality, such as image capture, audio capture, notification generation, and other device-specific functions, may use native (platform-specific) user interface components linked to native application logic. In some examples, plugin definition repository 150 may be a versioned repository, and plugin version data may be updated as the configuration of a plugin (e.g., widgets used by the plugin, functions referenced by the plugin, and the like) changes.

Widget repository 160 may store data defining widgets that can be included in one or more plugins defined in plugin definition repository 150. Each widget stored in widget repository 160 may define a set of user interface components configured to perform a specific task. For example, widgets may include components for performing image processing or audio processing on a client device 120, components for obtaining data entry from a user through a data entry form, and the like. A native widget may be built and implemented using code components that are native to the platform (e.g., native to an operating system executing on a particular device).

Widgets that do not depend on platform-specific functionality are non-native widgets. These widgets may be cross-platform widgets and may include web-based widgets or framework-based widgets. A cross-platform widget, for example, may be built and implemented using web-based code components that can be executed by a web browser (e.g., web widgets) or using cross-platform framework-based code components that can be executed in a framework-based runtime environment (e.g., framework-based widgets).

User interface component repository 170 generally stores data defining cross-platform user interface components that may be used by one or more widgets to display a user interface on client device 120. In some cases, user interface component repository 170 may store user interface components that can be used across different computing platforms (i.e., cross-platform components) and user interface components that may be specific to a particular platform (e.g., user interface components corresponding to functionalities of a particular type of device running a particular operating system). As discussed, a workflow definition generated by interface generator 134 may include data identifying the plurality of user interface components to be displayed on client device 120, and client device 120 can retrieve the identified user interface components from user interface component repository 170 or from user interface components deployed on the client device 120 based on whether the user interface components are platform-agnostic or platform-specific functionality.

Application logic repository 180 may provide a versioned repository containing code contracts and other software artifacts for the functional code implementing the workflow processed by the server computer 130 and displayed on the client device 120. The code contracts stored in application logic repository 180 may be associated with one or more functions that a user can invoke through interaction with the one or more user interface components specified in a workflow definition and associated with a plugin associated with a step in the workflow. Each code contract may define, for example, the name of a function that a user can invoke, the required inputs for the function, optional inputs that may be, but are not required to be, provided in an invocation of the function, and the output generated by the function. The other software artifacts may further describe the one or more functions that a user can invoke, such as the functional code implementing the workflow. Server computer 130 may store application logic in the application logic repository 180 and retrieve application logic from the application logic repository 180.

Figure 2:
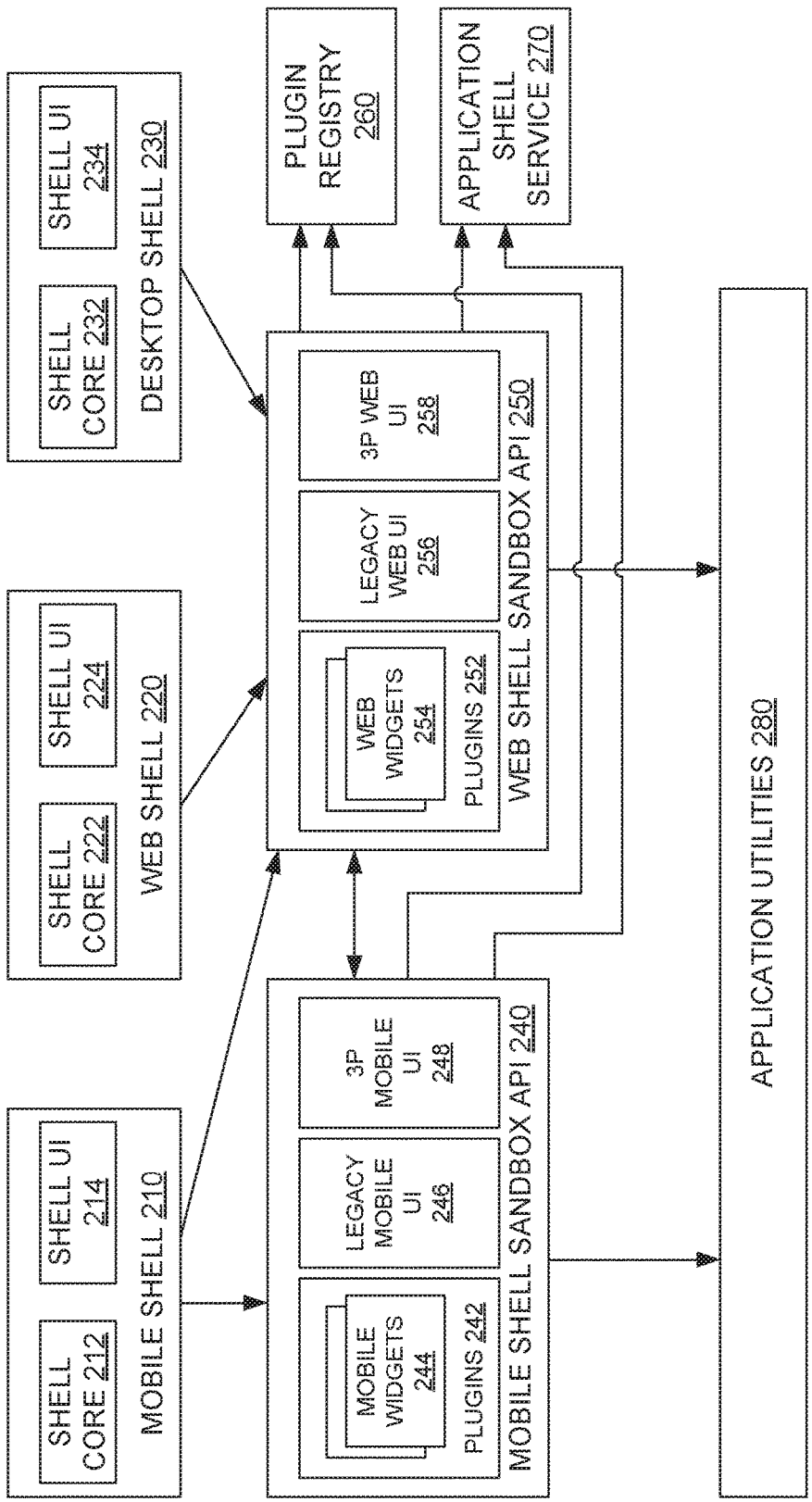
FIG. 2 illustrates an exemplary system architecture for dynamically generating and deploying user interfaces in cross-platform applications, according to one embodiment.

FIG. 2 illustrates an exemplary system architecture 200 for dynamically generating and deploying user interfaces in cross-platform applications. While the description of FIG. 2 focuses on web widgets as a non-native type of widget, the same concepts apply to other non-native widgets such as framework-based widgets.

As illustrated, system architecture 200 generally includes a native mobile shell 210, a web shell 220, and a native desktop shell 230, each of which may communicate with one or more shell sandbox APIs, such as the mobile shell sandbox API 240 and the web shell sandbox API 250, to access application utilities and other capabilities provided by a shell runtime, as discussed in further detail herein.

Each shell 210, 220, and 230 may allow for the dynamic generation of customized user interfaces and user experiences for applications executing on top of the shell. Each shell may be made available (e.g., via one or more data repositories) as a library that may be semantically versioned (e.g., versioned using a three part version number, such as 1.2.3, representing a major version, a minor version and a patch, respectively). Native mobile applications may consume the mobile shell 210 as a library and package the mobile shell 210 as part of the application. The web shell 220, however, may be hosted by an application server, such as application server 140 in FIG. 1, for a specific software product and may be deployed such that applications and widgets built on the web shell 220 are continually integrated and updated. In some aspects, the native desktop shell 230 may use similar components as the web shell 220, because the native desktop shell 230 may be configured to encapsulate a web interface to deliver a software product to a user.

The shells 210, 220, and 230 may use consistent application programming interfaces (APIs) across platforms. While the implementation of API functions may differ between the mobile shell 210, the web shell 220, and the desktop shell 230, the APIs may be defined according to consistent code contracts that define required inputs, optional inputs, and required outputs for each function exposed by the API. The inputs and outputs may be defined, for example, as a variable name and a variable type indicating a data type associated with each named variable to be provided as input into a function or generated as an output by the function. To promote code reuse across the shells 210, 220, and 230, cross-platform code (e.g., code written in JavaScript, PHP, or other languages that can be executed in various computing environments with similar execution results) may be used to implement the shells 210, 220, and 230. In some aspects, each of the shells 210, 220, and 230 may include functionality tailored to the unique capabilities of each platform. For example, because mobile devices may have less computing power than desktop computers, laptop computers, or cloud computer farms on which an application may be executed, the mobile shell 210 may additionally include support for hydrating a cross-platform widget so that the hydrated data may be stored in memory, but not loaded into an object until the object is to be used.

Each shell 210, 220, and 230 may allow for the creation of dynamic user interfaces and user experiences customized for a particular user by combining native and non-native user interface components from a variety of relevant plugins, as discussed above. The plugins selected by a shell 210, 220, or 230 may be selected based on the context in which a user is executing the application 122 (e.g., a step in a workflow that the user is currently executing, the next step in the workflow that the user may be expected to execute, and so on) and, in some embodiments, the platform on which the user is executing the application 122.

In some aspects, plugins 242 and 252 may be modular, self-contained software components of an application that expose specific features of the application. Examples of plugins may include navigation bars that allow a user to move between different steps of a workflow executed within the application 122, progress bars that display an amount of the workflow that a user has completed (and correspondingly an amount of the workflow that remains to be completed), application-specific features, features that leverage hardware present on the computing device on which the application 122 is executing (e.g., image capture using one or more cameras integrated into a client device, authentication using one or more biometric data capture devices integrated into a client device, etc.). Because each plugin may be self-contained, applications may be decomposed into a plurality of independently maintainable components (i.e., independently debugged, updated, extended, etc.).

Each plugin (e.g., 242 or 252) may include two parts: a configuration and one or more widgets. The configuration generally identifies the widgets included in the plugin, a code contract, permissions, the behavior of the plugin, and intended interactions with other widgets or an application (e.g., application 122 in FIG. 1). In some embodiments, legacy code components (e.g., native code components that were created for previous versions of a software product and are intended to be reused in a cross-platform application) and third-party components (e.g., extensions to an application) may be included in a plugin to be compatible with the platform. The user interfaces associated with legacy components or third-party components may be implemented as a widget that can be loaded into a shell 210, 220, and/or 230.

Each plugin (e.g., 242 and 252) and widget (e.g., 244 and 254) may be registered in a central configuration service, such as plugin registry 260. Plugin registry 260 represents a centrally managed service that manages the plugin configurations that may be used by applications hosted in shells 210, 220, or 230 to provide customized user experiences based on, for example, preferences of the user, a geographic location of the client device, a language currently used by the application, etc. The plugin registry 260 generally is responsible for delivering applicable configuration data for a specific application.

By registering plugins in plugin registry 260, and by defining plugins as a configuration and a plurality of widgets, different versions of a cross-platform application may be supported by various platforms. For example, an application deployed via web shell 220 and/or native desktop shell 230 may integrate cross-platform user interface generation tools, JavaScript libraries, such as Dojo, JQuery, or Angular, and other technologies which can be leveraged to deploy a web-based version of a cross-platform user interface, regardless of whether the user interface is being deployed in a web browser or a native application that includes a web browser component. Similarly, an application deployed via mobile shell 210 may integrate cross-platform user interface generation tools, native code components (e.g., Java components for applications deployed on Android devices or Objective C components for applications deployed on mobile device operating systems, such as iOS, Android, Windows Mobile, at the like), and other technologies that can be leveraged to deploy a native mobile version of the cross-platform user interface.

Mobile shell 210 generally is an application that executes on a mobile device (e.g., a smartphone, handheld computer, or tablet computer) and integrates web-based user interfaces (UIs) and native mobile UIs to create a customized application that is tailored to the capabilities of the mobile device on which mobile shell 210 executes. To integrate web-based UIs and native mobile UIs, an instance of web shell 220 may be integrated into mobile shell 210 at runtime (not shown). UI components that are executed as a web component (e.g., web forms, hypertext markup language (HTML) UI elements, and the like) may be executed within the web shell 220. The mobile shell 210 can additionally leverage device-specific capabilities using native mobile UIs and code components. These device-specific capabilities may include, for example, integrated cameras for image capture and data extraction (e.g., of a tax form, a receipt, or other printed document with data to be ingested into an application), movement or location tracking devices (e.g., accelerometers, satellite positioning system (Global Positioning System (GPS), GLONASS, GALILEO, etc.) receivers or cellular-assisted satellite positioning systems), and other device-specific capabilities that widgets can leverage to perform actions related to an application hosted in the mobile shell 210.

The web shell 220 integrated into the mobile shell 210 can delegate one or more actions to the mobile shell 210 via a programmatic bridge, which allows for applications executed within the mobile shell 210 to be customized and optimized for different kinds of mobile devices. In one example, customization and optimization of an application executing in the mobile shell 210 may include the use of different image capture modules based on the capabilities of a mobile device on which the mobile shell 210 is executing. For lower-cost devices with slower processors, the image capture module executed in the mobile shell 210 may, at least in part, offload image processing to a cloud service or another computing device, while for higher-cost devices with more processing power, the image capture module executed in the mobile shell 210 may perform image processing and data extraction on the mobile device itself. In another example, the customization and optimization of an application executing in the mobile shell 210 may include customizations based on the screen size and screen resolution of the device on which the mobile shell 210 is executing. For a mobile shell 210 executing on a smartphone, navigation components may be hidden until requested by a user, while navigation components may be displayed in a mobile shell 210 executing on a mobile device having a larger screen (e.g., a tablet computer). In another example, a mobile shell 210 executing on a smartphone with a high-resolution screen (e.g., a QHD (2560 pixels by 1440 pixels), 4K (3840 pixels by 2160 pixels), or 8K (7680 pixels by 4320 pixels) screen) may receive user interface components that are scaled for high-resolution screens, while a mobile shell 210 executing on a mobile phone with a lower-resolution screen (e.g., a 720p (1280 pixels by 720 pixels) or 1080p (1920 pixels by 1080 pixels) screen) may receive user interface components that are scaled for lower-resolution screens.

Shells 210, 220, and 230 may host a variety of applications that share user interface components (e.g., widgets and plugins) to implement different functionality. To reduce the storage and memory footprint of an application hosted within a shell, shells 210, 220, and 230 may load widgets based on the application hosted within the shell. For example, a tax preparation application may load a first set of widgets (e.g., tax liability/refund calculators, a completeness engine, tax support modules, emotional response modules, and the like). An accounting application, on the other hand, may load a different set of widgets (e.g., credit/debit calculators, statement generators, and the like), as the functionality of the accounting application does not depend on the same widgets as the tax preparation application.

Generally, shells 210, 220, and 230 provide a widget specification. The widget specification generally is a platform-neutral description of UI widgets that is implemented by the widgets. The widgets that are loaded into shells 210, 220, and 230 generally do not depend on the specific implementation of a shell 210, 220, or 230. Rather, the widgets may depend on a sandbox application programming interface (API) provided by a shell. For example, the web shell sandbox API 250 may be a common sandbox for all cross-platform widgets. As illustrated in FIG. 2, mobile shell 210 exposes a mobile shell sandbox API 240 and a web shell sandbox API 250, while web shell 220 and native desktop shell 230 expose the web shell sandbox API 250. Exposing shell sandbox APIs 240 and 250 may enable widgets to access to shell services, such as common capabilities, application context, authentication, and the like. Because the widgets depend on a sandbox API 240 and/or 250, widgets can be built with minimal dependencies on other widgets (e.g., not loaded in the shell) or services other than those provided by the shell, which allows the widgets to be embeddable into any application that is hosted within a shell 210, 220, or 230.

In some embodiments, application-specific monoliths (e.g., code for generating a user interface and application logic) that are not cross-platform compatible may be decomposed into a plurality of widgets that may be hosted within a shell 210, 220, or 230. To allow application-specific monoliths (or components of an application-specific monolith) to be executed within a shell 210, 220, or 230, the shells 210, 220, and 230 can execute an application-specific monolith or components of an application-specific monolith in a sandbox widget (not shown). The sandbox widget allows for the execution of legacy code within a shell 210, 220, or 230 that conforms to the functionality, calling conventions, and code execution rules enforced by sandbox APIs 240 and/or 250. The sandbox widget generally delegates tasks to legacy code that implements the application-specific monolith, but exposes the functionality of the widget in a manner that conforms to the code contracts established for communications between plugins and widgets in the shells. As application-specific monoliths are transitioned to widgets and plugins, usage of the sandbox implementation of application-specific monoliths may be discontinued.

Shells 210, 220, and 230 additionally provide mechanisms to enable widgets hosted within a shell 210, 220, or 230 to communicate with other widgets hosted in the shell. The communications mechanisms provided by a shell may provide for asynchronous communications between different widgets. These communications may be, in some cases, event driven (e.g., triggered when some condition occurs within an application, such as user interaction with a graphical user interface component, expiration of a timer, etc.). In some cases, asynchronous communications between different widgets may be supported via communications channels between the widgets.

Shells 210, 220, and 230 may provide support for login, user authentication, and hydration of widgets. For login and user authentication, shells 210, 220, and 230 may include modules for username/password authentication, biometric authentication, possession-based authentication, or a combination of authentication methods (multi-factor authentication). Biometric authentication modules may interact with a variety of authentication data capture devices on a client device, such as front-facing cameras on tablets or smartphones, web cameras on laptop or desktop computing devices, fingerprint readers, iris scanners, or other biometric devices for user authentication to allow for user enrollment and authentication.

Shells 210, 220, and 230 may be configured to support extensions. Support for extensions allows existing applications to add to the capabilities of the shells and customize shells for application-specific needs. For example, multiple hydration extensions may be made available for use in applications hosted within a shell 210, 220, or 230. These extensions may provide different mechanisms for mapping data into data objects for use in an application (or a portion of an application). By supporting extensions, shells 210, 220, and 230 further assist the transition from application code monoliths to applications that are dynamically created from a plurality of independently maintainable widgets and plugins, thereby simplifying software development and allowing for the rapid release of applications with consistent user experiences.

As illustrated, each shell 210, 220, and 230 includes a shell core 212, 222, and 232, respectively, and a shell user interface 214, 224, and 234, respectively. The shell cores 212, 222, and 232 may include a shell kernel that manages the lifecycle of an application hosted within a shell 210, 220, or 230 and the shell user interface 214, 224, or 234 rendered according to a device-specific workflow definition. Lifecycle management generally includes initialization of an application, termination of an application, deferring of actions, pausing of an application (e.g., when an application is minimized or otherwise placed in a suspended state), state recovery (e.g., when an application is maximized or otherwise reactivated from a suspended state), and the like. The shell cores 212, 222, and 232, may further provide support for hydration, plugin/widget management, event handling, asynchronous communications, and shell extension and customization.

Shell user interfaces 214, 224, and 234 render user interfaces dynamically based on client device information and the workflow that a user is executing. Shell user interfaces 214, 224, and 234 provide layout and navigation management, flow control (e.g., to control the transition from one step to another step of a workflow implemented by an application hosted in shells 210, 220, or 230), user login/authentication, and the like. Shell user interfaces 214, 224, and 234 may be a barebones (or blank) user interface. Applications hosted within a shell 210, 220, or 230 can populate shell user interfaces 214, 224, 234 with the graphical user interface components that enable a user to perform one or more tasks. Applications using a shell user interface 214, 224, or 234 generally define the user experience, which allows for application development teams of each shell UI to customize the user experience for the specific platform and application hosted within a corresponding shell 210, 220, or 230.

As illustrated, shell sandbox APIs 240 and 250 allow for execution of a variety of plugins and widgets. The specific plugins and widgets hosted in sandbox APIs 240 and 250 may be determined based on a type of device being used (e.g., native mobile widgets may be executed using mobile shell sandbox API 240, while web widgets may be executed using web shell sandbox API 250). As illustrated, mobile shell sandbox API 240 supports the execution of plugins 242, including one or more mobile widgets 244, a legacy mobile UI 246 (e.g., a UI associated with legacy code monoliths implemented as a widget that can be loaded into a shell 210, 220, and/or 230 of architecture 200), and third-party mobile UIs (e.g. 248) associated with extensions to one or more applications. Web shell sandbox API 250, which may be leveraged by any of mobile shell 210, web shell 220, and desktop shell 230 for the execution of web-based widgets, supports the execution of plugins 252, including one or more web widgets 254, a legacy web UI 256 associated with legacy code monoliths implemented as a widget that can be loaded into a shell (e.g. shells 210, 220, and/or 230) of architecture 200, and third-party web UIs (e.g., 258) associated with extensions to one or more web applications. Third-party UIs 248 and 258 may be developed and deployed by other developers for integration into one or more software product offerings that may be executed within a shell 210, 220, or 230.

Shell sandbox APIs 240 and 250 may provide mobile widgets 244 and web widgets 254 access to application utilities 280 and common capabilities. The application utilities 280 and common capabilities may be provided by a shell runtime. These utilities and common capabilities may include, for example, activity logging, analytics, authorization context tracking, application context tracking, and so on. The shell sandbox APIs 240 and 250 may provide a versioned public code contract that defines how consumers (i.e., different widgets and plugins, regardless of whether a widget or plugin is a first-party widget or plugin or a third-party widget or plugin) interact with the sandbox and the functionality exposed by shell sandbox APIs 240, 250. At runtime, shells 210, 220, and 230 can create an instance of a sandbox and make the sandbox available to widgets at runtime, and the widgets loaded into a shell 210, 220, or 230 can access sandbox-provided services according to the versioned public code contract. In some aspects, the sandbox APIs 240, 250 may be extended by applications hosted in a shell 210, 220, or 230 to add application-specific features and behavior.

As discussed, application utilities 280 may be provided to widgets and plugins via one of shell sandbox APIs 240 or 250. In some cases, the utilities may include an application shell service 270, which manages initializing each shell by orchestrating between a plugin registry 260 and platform services for the relevant data to initialize the shell, which may be customized for a specific application and platform (e.g., for application X on mobile, on web, and on desktop/laptop computers). In some aspects, a mobile version of application shell service 270 may define a default configuration for initialization that may be packaged with a mobile application to optimize the performance of the mobile application.

Figure 3:
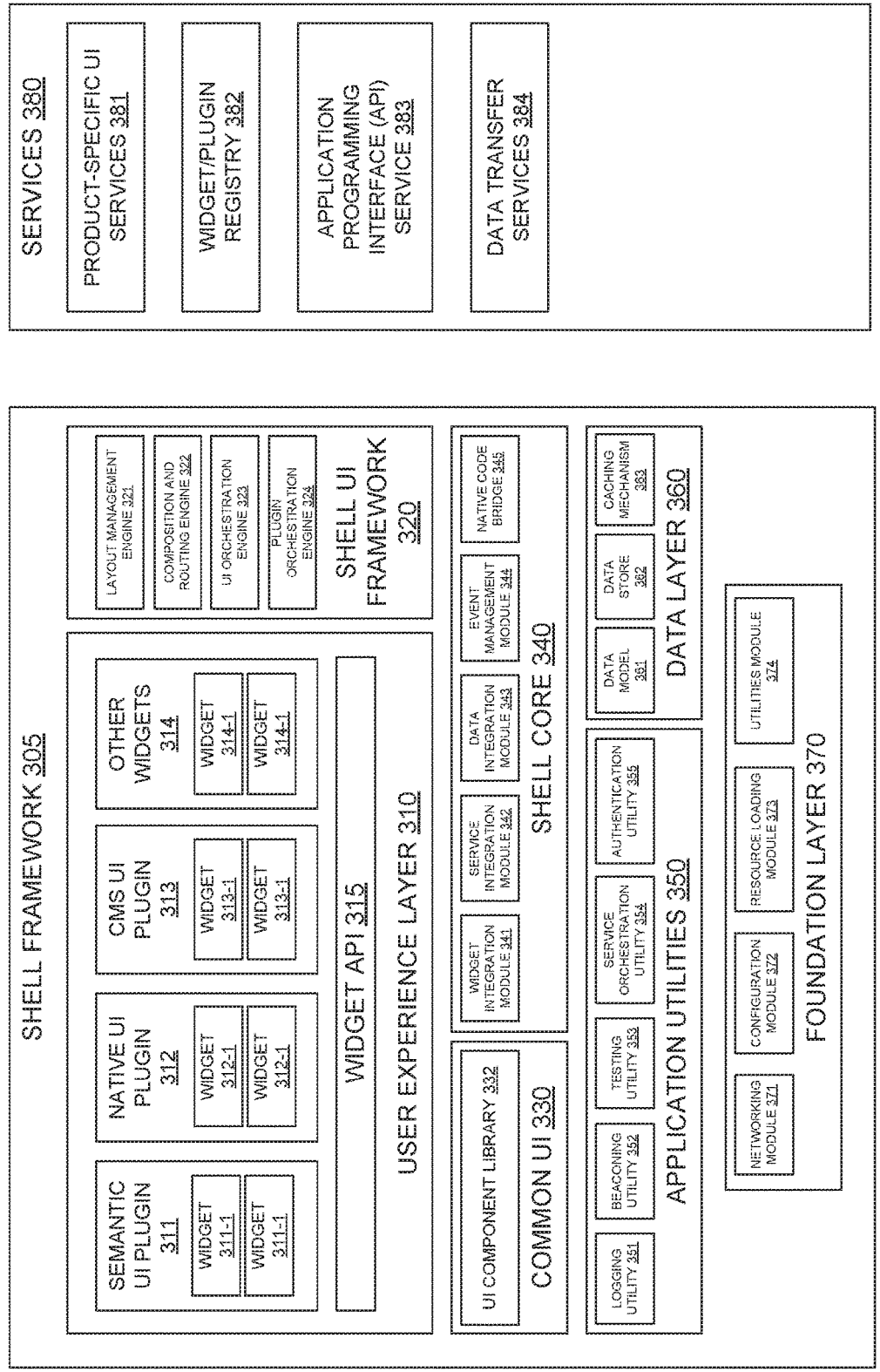
FIG. 3 illustrates an example shell framework architecture for dynamically generating and deploying user interfaces to client devices executing a cross-platform application, according to one embodiment.

FIG. 3 illustrates an example shell architecture 300 for dynamically generating and deploying user interfaces in cross-platform applications. As illustrated, shell architecture 300 generally includes an application shell framework 305 and services 380.

Application shell framework 305 generally comprises a majority of the application code and provides the underlying architecture that enables the dynamic generation of user interfaces for applications based on user context, device information, and so on. As illustrated, shell framework 305 includes a user experience layer 310, a shell user interface framework 320, a common user interface layer 330, shell core 340, application utilities 350, application data 360, and foundation layer 370.

User experience layer 310 generally hosts a plurality of plugins 311, 312, 313, other widgets 314 and a widget application programming interface (API) 315. Semantic UI plugin 311 generally hosts a plurality of cross-platform widgets 311-1. The cross-platform widgets 311-1 generally are widgets that may be rendered on a variety of computing devices (e.g., smartphones executing various operating systems, desktop computers, laptop computers, tablets, etc.) in either native application shells or a web shell executable within a web browser.

Native UI plugin 312 generally hosts a plurality of device-specific widgets 312-1 that may implement a variety of device-specific features.

Content Management System (CMS) UI plugin 313 generally hosts a plurality of widgets 313-1 that are used to implement a content management system within an application hosted within a shell. These CMS widgets 313-1, for example, provide document versioning, document tracking, and other services that can be used to manage documents uploaded and created by an application.

Other widgets 314 generally hosts, for example, widgets 314-1, which may include any additional widgets written using current technology or new technology that may be added over time.

Widget API 315 generally provides an interface to the various widgets included in the one or more plugins 311, 312, 313, 314 to allow the widgets to access one or more tools hosted in the shell core 340 and/or application utilities 350, access application data 360, or interact with device hardware through foundation layer 370.

Shell UI framework 320 generally implements one or more modules that aid in rendering a user interface on a device. As illustrated, shell UI framework 320 generally includes a layout management engine 321, composition and routing engine 322, UI orchestration engine 323, and plugin orchestration engine 324. Layout management engine 321 generally uses information in a device-specific workflow definition to determine an order in which plugins, widgets, and the associated user interface components are displayed on a device. Composition and routing engine 322 generally renders the user interface on a device and instantiates one or more event handlers to route user interaction to the appropriate function or code module for processing. UI orchestration engine 323 is generally a data-driven engine that uses data input into an application to orchestrate events that are invoked within an application. Plugin orchestration engine 324 generally orchestrates communications between different plugins, as discussed above.

Common UI 330 generally includes cross-platform user interface components that are shared across different versions of a shell (i.e., shared across native mobile shell 210, web shell 220, and native desktop shell 230). As illustrated, common UI 330 includes a UI component library 332, which may include information defining the various shared user interface components that can be rendered on a device. A plugin can reference specific components defined in UI component library 332 in a definition of the visual layout or organization of the plugin. When shell UI framework 320 renders the plugin, shell UI framework 320 accesses UI component library 332 to obtain definitions of the common UI components and renders the plugin according to the obtained definition.

Shell core 340 generally hosts one or more modules that enable execution of applications within an application shell.

As illustrated, shell core 340 includes a widget integration module 341, service integration module 342, data integration module 343, event manager 344, and a native code bridge 345.

Application utilities 350 generally include the common utilities leveraged by various applications during execution. These utilities may include, among others, a logging utility 351, a beaconing utility 352, testing utility 353, service orchestration utility 354, and authorization utility 355. These utilities may be implemented according to a code contract that is consistent across different shells (i.e., across native mobile shell 210, web shell 220, and native desktop shell 230) so that application utilities 350 work consistently across different platforms.

Application data layer 360 generally stores data models and user data at a local device and delivers the data to a remote source. Data model 361 generally defines relationships between data objects that are used within an application. The definitions may include the names of variables, data types, and other information that defines a data object and the interactions between different data objects. Data store 362 may be a relational or non-relational database that stores user data according to one or more data models in data models 361. Caching mechanism 363 may orchestrate the transmission of data to a remote source for commitment to a remote database.

Foundation layer 370 generally includes modules that interact with device hardware and define the low-level behavior of a shell framework 305. As illustrated, foundation layer 370 includes a networking module 371, configuration module 372, resource loading module 373, and utilities module 374. Networking module 371 generally provides an interface through which an application executing within an application shell framework 305 communicates with other computing devices. This interface may include, for example, functions that convert data into a bitstream that may be encapsulated into one or more packets for transmission to another device via a network interface, such as a wired interface, an 802.11 wireless interface, a cellular wireless interface, or other data transfer interfaces. Configuration module 372 generally configures the shell framework 305 for execution on a specific device. Resource loading module 373 allows an application executing within a shell framework to reserve resources (e.g., temporary and/or persistent memory, CPU time, etc.) on a device to allow for execution of the application. Utilities module 374 generally provides basic utilities that the shell framework 305 uses for error recovery, memory management, and other purposes.

As discussed above, widgets and plugins hosted within a shell framework 305 may interact with various services 380 through, for example, service integration module 342 in shell core 340. As illustrated, the services that support execution of applications within a shell framework 305 may include product-specific UI services 381, a plugin repository 382, an application programming interface (API) service 383, and data transfer services 384. Product-specific UI services 381 generally provide product-specific user interface data to an application executing in shell framework 305. As discussed in detail above, a shell framework 305 can interact with plugin repository 382 to retrieve the appropriate version of a plugin and the widgets identified in a plugin definition for rendering on a user device. During execution of an application, the application may invoke one or more functions of a remote processing system represented by API service 383, which defines the functions that can be invoked by the application, the required and optional data inputs, and the type of data returned in response to the function call (if any). To invoke a function exposed by API service 383, a data transfer service 384 may provide a gateway between the application executing on a client device and the API service. The gateway may receive a request from a client device, generate and invoke a function call based on the received request, receive data from API service 383, and return the received data to the client device on which the shell framework 305 is executing.

Example Third Party Integration

Figure 4:
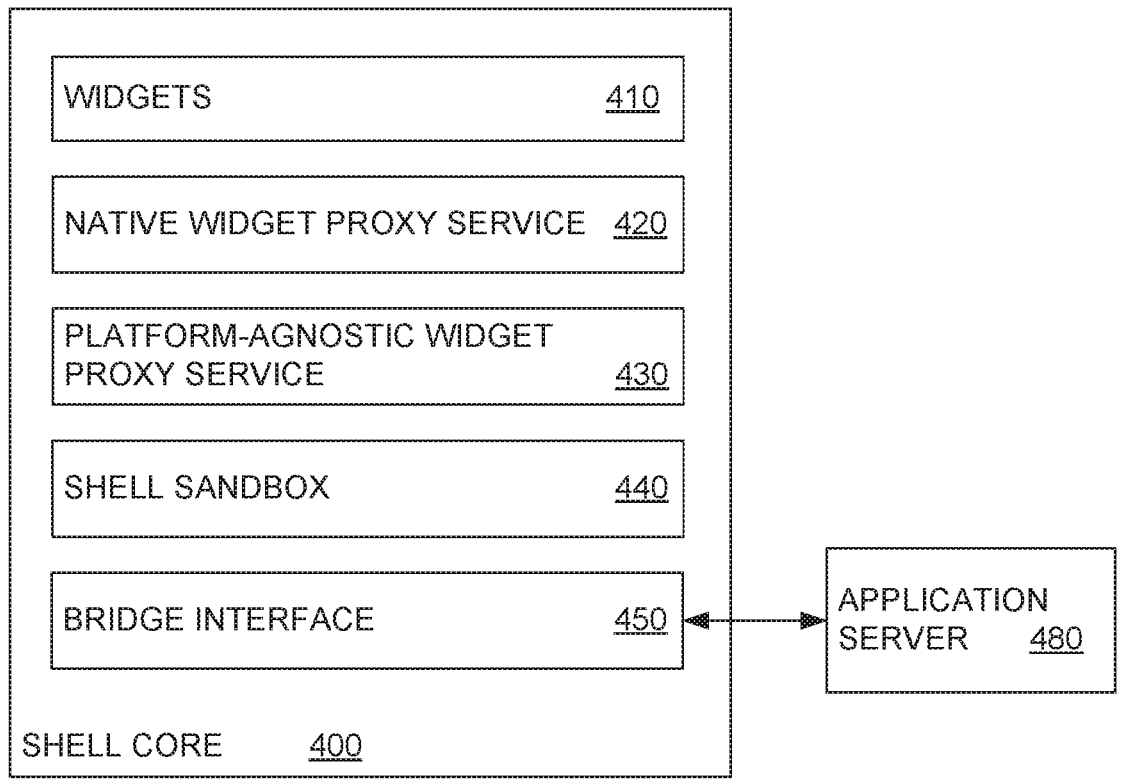
FIG. 4 illustrates an exemplary shell core that integrates plugins and widgets into an application, according to one embodiment.

FIG. 4 illustrates an exemplary shell core 400 that integrates plugins and widgets into an application. As illustrated, shell core 400 generally includes one or more widgets 410, a native widget proxy service 420, a platform-agnostic widget proxy service 430, a shell sandbox 440, and a bridge interface 450.

The shell core 400 may receive a workflow definition specifying one or more widgets 410 to be loaded into the shell core 400. The widgets 410 loaded in the shell core 400 may include native widgets or non-native widgets. Each widget in widgets 410 includes a widget descriptor. The widget descriptor for a given widget may include a unique ID for the widget, one or more functions that can be performed by the widget, one or more events that the widget is capable of generating, properties the widget has available, properties necessary for the widget to perform a function or generate an event, and the like. The widget descriptor may be used by an application (e.g., application 122 in FIG. 1) to identify a widget and a function to be executed by that widget.

A native widget may be a widget built using code that is native to the platform in which the shell core 400 is executing. A cross-platform (i.e., platform-agnostic) widget may be built using code that is not native to the platform but compatible with the shell core 400. A cross-platform widget may execute within a runtime container provided by the shell core 400.

The native widget proxy service 420 provides an interface between one or more native widgets and the shell sandbox 440. The native widget proxy service 420 may monitor all communications to and from the native widgets. Although the native widgets can communicate directly with the application, by monitoring communications of the native widgets, the native widget proxy service 420 enables the shell core 400 to maintain current data for activity logging and analytics.

The platform-agnostic widget proxy service 430 may provide a runtime environment in which cross-platform widgets may execute. For example, the platform-agnostic widget proxy service 430 may provide an internet browser-based runtime environment in which web-based widgets are executed and a framework-based runtime environment in which framework-based widgets are executed.

The platform-agnostic widget proxy service 430 may be initialized by the shell core 400 when a cross-platform widget is to be loaded into widgets 410. For example, upon the application requesting a cross-platform widget, the shell core 400 may create the platform-agnostic widget proxy service 430 to host the cross-platform widget.

The shell sandbox 440 may provide common services for both native widgets and cross-platform widgets, such as activity logging, analytics, application context tracking, authentication, and the like. An instance of the shell sandbox 440 may be provided to each widget, whether a native widget or a cross-platform widget. An instance of the shell sandbox 440 provided to a widget may provide an interface between the widget and a shell sandbox API (e.g., shell sandbox APIs 240 and 250 in FIG. 2).

The platform-agnostic widget proxy service 430 may route communications to and from cross-platform widgets to the shell sandbox 440 so that the shell sandbox 440 can update activity logs and analytics data for the widgets. The shell sandbox 440 enables integration of plugins and widgets built with different technologies (e.g., native widgets based on an operating system of the client device, web-based widgets, and framework-based widgets).

To load a cross-platform widget into widgets 410 in the shell core 400, the application may provide the widget descriptor of the cross-platform widget to the shell core 400. The application may also provide a context of the application at the time when the application requests to load the cross-platform widget. The context may include at least one of a geographic location of the client device, a language currently used by the application, or a context of the user. The context provided by the application may affect a behavior of the widget or how the widget is rendered by the application.

To unload a widget from the shell core 400, memory reserved for that widget may be deallocated. For a cross-platform widget, the shell core 400 may deallocate memory reserved for that widget. However, the platform-agnostic widget proxy service 430 may remain in the shell core 400 to be reused by another cross-platform widget. An unload request may be received from the application once the widget to be unloaded is no longer needed by the application.

A cross-platform widget may be designed to execute in an application other than the application on a client device (e.g., client device 120 in FIG. 1). In that case, the cross-platform widget may not be compatible with the application on the client device. However, to provide a user experience within the application consistent with a user experience within the application for which the cross-platform widget was designed, a web page may be used to provide a consistent user experience across different platforms.

For example, the shell core 400 may execute within an inline frame of a web page provided by the application. The bridge interface 450 provides an interface between an application server 480 and the inline frame in which the shell core 400 is executing. If the shell core 400 is executing within the application, the bridge interface provides an interface directly between an application server 480 and the shell core 400. The bridge interface 450 federates communications between the application and widgets loaded in the shell core 400. All communications to and from a given cross-platform widget may be routed through the bridge interface 450. That is, the bridge interface 450 may control widget-to-widget communication as well as widget-to-application and application-to-widget communication. Although a widget executing in the platform-agnostic widget proxy service 430 can communicate directly with another widget executing in the same proxy 430, any communication between the widgets may be routed to the bridge interface 450 so that the bridge interface 450 can monitor and track all communications between widgets.

In some cases, a communication through the bridge interface 450 may be event driven. For example, a widget may transmit a communication to the application upon completion of a function requested by the application. In some cases however, the communication itself or data within the communication may trigger an event. For example, an application workflow definition may specify that a widget designed to create an invoice is to create an invoice for a user of the client device. Upon creating the invoice, the widget may transmit a communication to the application indicating that the invoice has been created. The communication may also include information associated with a corresponding transaction such as an amount. When the communication is processed by the bridge interface 450, if the amount satisfies a threshold value, a message may be transmitted to the application, which, in response to the message, generates an alert to be displayed to inform the user that the invoice exceeds the threshold value.

The application server 480 may receive data from the application directed to a widget loaded in the shell core 400. For example, the application server 480 may receive data input by the user into a user interface of the client device. The application server 480 may transmit the received data to the bridge interface 450. In some embodiments, the application may execute within a second inline frame of the web page provided by the client device.

Utilizing an inline frame enables a user experience to be consistent across different platforms because an inline frame allows a user experience to be easily transitioned between different platforms. For example, a user may begin a workflow on one device that receives a device-specific user interface (e.g., a smartphone) and later finish the workflow on another device, such as a desktop computer. Because the functionalities and user interface components provided by the shell core are not tied to a particular platform or application, a user can flexibly transition the user experience between platforms.

Upon receiving a communication between the application server 480 and a particular widget loaded in the shell core, the bridge interface 450 may determine a destination of the communication. For example, if the communication is received from the application and directed to a widget, the bridge interface 450 may identify a destination widget based on a widget descriptor in the communication. In that case, the bridge interface 450 may determine if the destination widget is currently loaded into widgets 410. If so, the bridge interface 450 routes the communication to the destination widget. However, if the widget is not loaded in the shell core 400, the widget currently loaded in the shell core 400 may be unloaded from widgets 410 and the destination widget may be loaded into widgets 410 the shell core 400. The bridge interface 450 may then route the communication to the destination widget.

In addition to determining a destination widget, the bridge interface 450 may identify a function specified in the communication that is to be invoked at the destination widget as well as parameters needed to execute the function. For example, if the function specified in the communication involves creating a user profile for the user of the client device, parameters to execute the function may include information identifying the user. Information identifying the user may include a name of the user, an email address of the user, a home address of the user, and the like. The bridge interface 450 transmits the function to be invoked at the destination widget and the parameters to execute the function to the destination widget.

If the bridge interface 450 receives a communication from a widget 410 loaded in the shell core 400 directed to the application, the communication may be routed through the application server 480. The communication from the widget may be configured to invoke an event at the application. For example, the communication may cause the application to transition from a widget currently executing a function requested by the application to another widget. In that case, the bridge interface 450 may determine if the other widget is currently loaded in widgets 410 in the shell core 400. If so, the bridge interface 450 routes the communication to the application, which then requests a function to be executed by the other widget. However, if the other widget is not currently loaded, shell core may load the other widget into widgets 410 before the bridge interface 450 routes the communication to the application.

Figure 5:
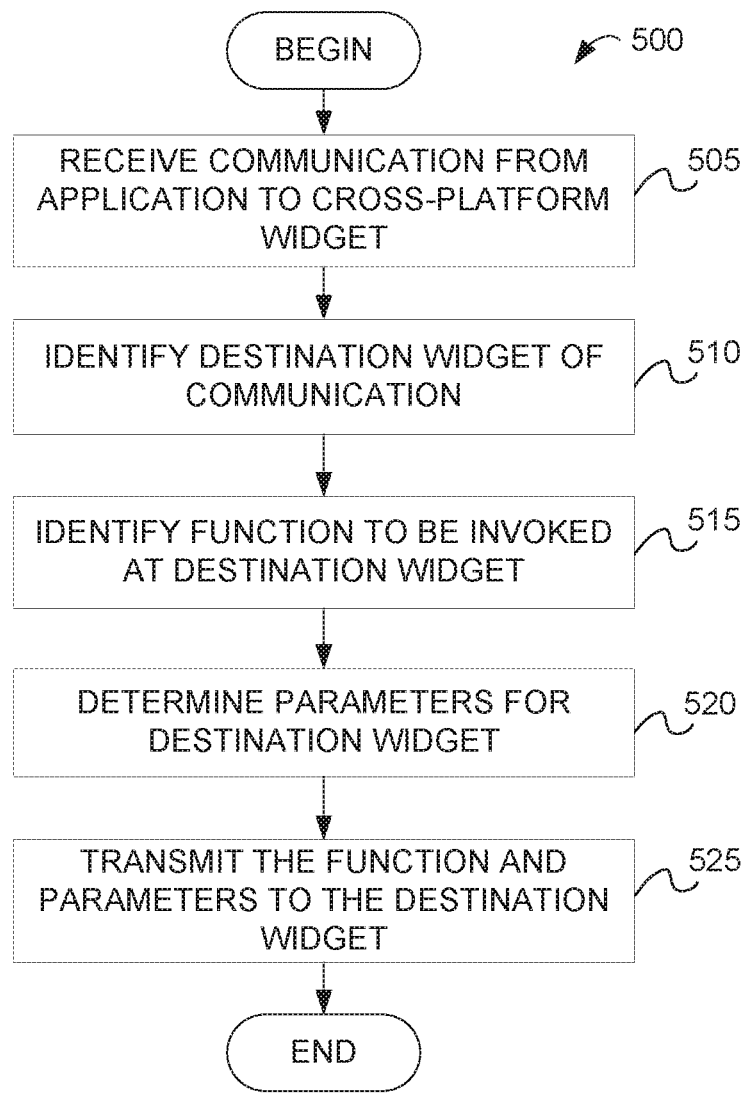
FIG. 5 illustrates example operations for invoking an event at a cross-platform widget, according to one embodiment.

FIG. 5 illustrates example operations 500 for invoking an event at a cross-platform widget, according to one embodiment.

As shown, the operations 500 start at step 505 where a bridge interface (e.g., bridge interface 450 in FIG. 4) receives a communication from the application directed to a cross-platform widget. The communication may include a widget descriptor for the destination widget. The widget descriptor may include a unique ID for the destination widget, one or more functions that the destination widget can execute, one or more events that the widget can generate, parameters of the widget, parameters necessary to execute a function or generate an event, and the like. The communication may also specify a function to be invoked at the destination widget.

At step 510, the bridge interface identifies a destination widget of the communication. The destination widget of the communication may be identified based on the widget descriptor included in the communication.

At step 515, the bridge interface identifies a function to be invoked at the destination widget. The function to be invoked at the destination widget is specified in the communication from the application. In some cases, the destination widget may be designed to execute only one specific function. Thus, the function to be invoked by the widget may not be specified in the communication. Rather, the communication may merely identify the destination widget and parameters necessary to execute the function, as discussed below.

At step 520, the bridge interface determines parameters needed by the destination widget to execute the function identified in step 515. In some cases, the parameters may be included in the communication from the application. For example, to invoke a function to create an invoice the widget may need parameters such as a date of a transaction, an amount of the transaction, an identity of the parties involved in the transaction, an identity of goods or services involved in the transaction, and the like. However, the parameters needed to execute the function may depend on another function that is executed by another widget. In that case, the bridge interface may request the other widget to execute the other function in order to obtain the necessary parameters. Once the other function is executed by the other widget and the necessary parameters are obtained, the operations proceed to step 525.

At step 525, the bridge interface transmits the function to be invoked and the parameters to the destination widget.

Figure 6:
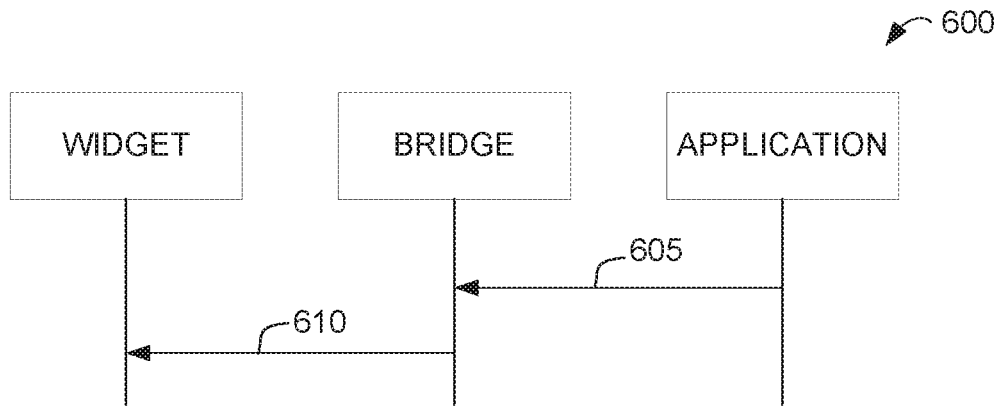
FIG. 6 is a call flow diagram illustrating an example message exchange between an application and a widget for invoking an event at the widget, according to one embodiment.

FIG. 6 is a call flow diagram 600 illustrating an example message exchange between an application and a widget for invoking an event at the widget, according to one embodiment.

As illustrated, a bridge interface (e.g., bridge interface 450 in FIG. 4) may receive a message 605 from the application. The message may include a widget ID of the destination widget, a function to be invoked at the destination widget, and parameters needed to execute the function.

As discussed above, the parameters needed to execute the function may not be included in the communication. In that case, to obtain the necessary parameters, the bridge interface may identify where the parameters are stored or a function that needs to be invoked by a different widget.

Once the parameters to execute the function are obtained, the bridge interface transmits a message 610 including the function to be invoked and the parameters to the destination widget.

Figure 7:
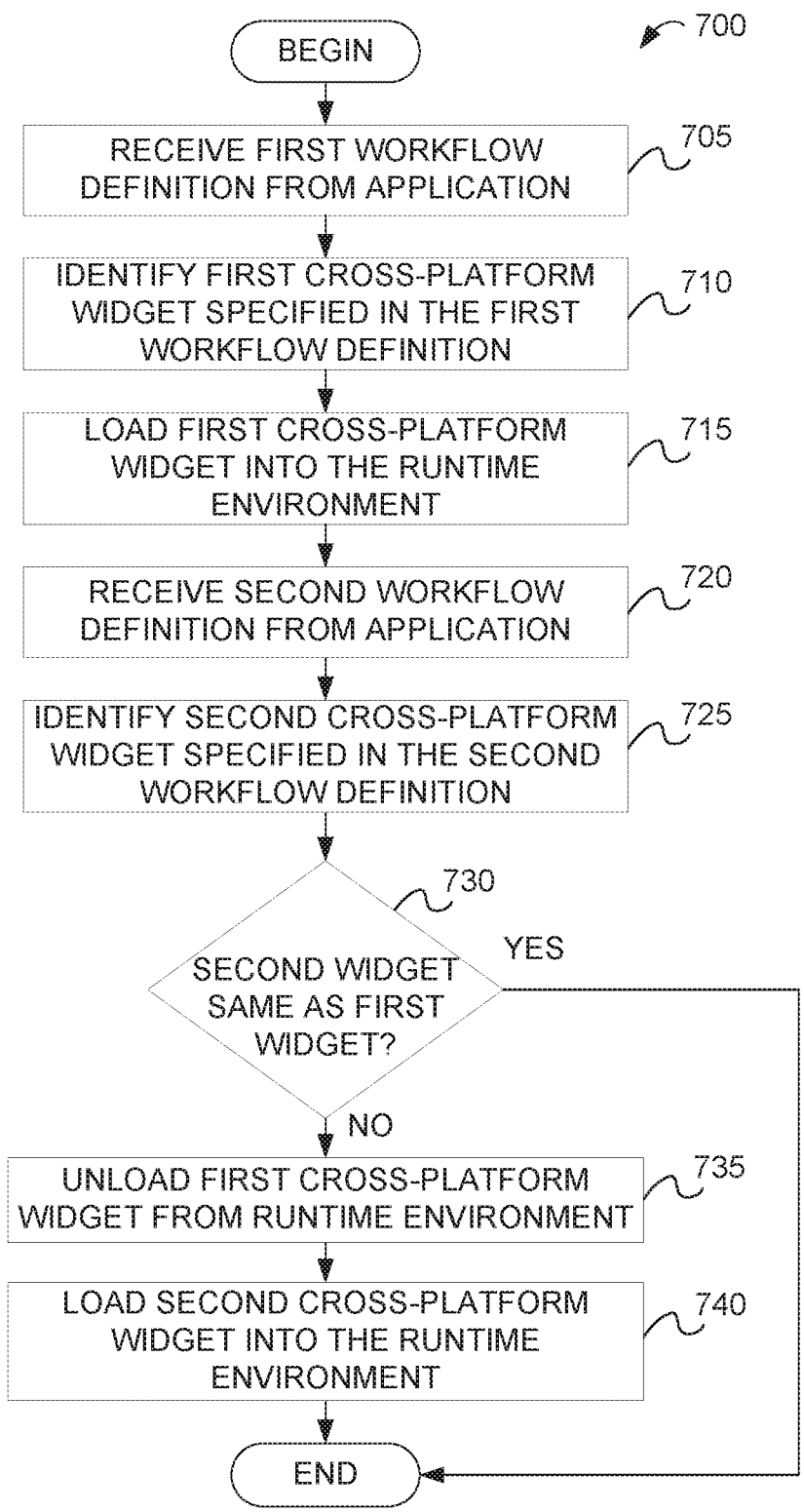
FIG. 7 illustrates example operations for invoking an event at the application to transition from a first widget to a second widget, according to one embodiment.

FIG. 7 illustrates example operations 700 for invoking an event at the application to transition from a first widget to a second widget, according to one embodiment.

As shown, the operations begin at step 705 where a bridge interface (e.g., bridge interface 450 in FIG. 4) receives a first workflow definition from an application server (e.g., application server 140 in FIG. 1). The first workflow definition may specify one or more widgets to be loaded into a shell core (e.g., shell core 400 in FIG. 4).

At step 710, the bridge interface identifies a first cross-platform widget specified in the first workflow definition. The first cross-platform widget may be identified by a unique ID of the first cross-platform widget included in the first workflow definition.

At step 715, the shell core loads the first cross-platform widget into a runtime environment. To load the first cross-platform widget, the shell core may instantiate a proxy service (e.g., a platform-agnostic widget proxy service 430 in FIG. 4) to provide the runtime environment.

At step 720, the bridge interface receives a second workflow definition from the application server. The second workflow definition may specify one or more widgets to be loaded into the shell core.

At step 725, the bridge interface identifies a second cross-platform widget specified in the second workflow definition. A unique widget ID in the second workflow definition may be used to identify the second cross-platform widget.

At step 730, the bridge interface determines whether the second cross-platform widget to be loaded into the runtime environment is the same as the first cross-platform widget currently loaded in the runtime environment. To do so, the bridge interface may compare the unique widget ID of the first cross-platform widget to the unique widget ID of the second cross-platform widget. If the second cross-platform widget is the same as the first cross-platform widget, the second cross-platform widget is already loaded in the runtime environment and the second workflow can be executed.

However, if the second cross-platform widget is not the same as the first cross-platform widget, the first cross-platform widget is unloaded from the runtime environment at step 735.

At step 740, the second cross-platform widget is loaded into the runtime environment. As discussed above, the second cross-platform widget may be loaded into a runtime environment provided by a widget proxy.

Figure 8:
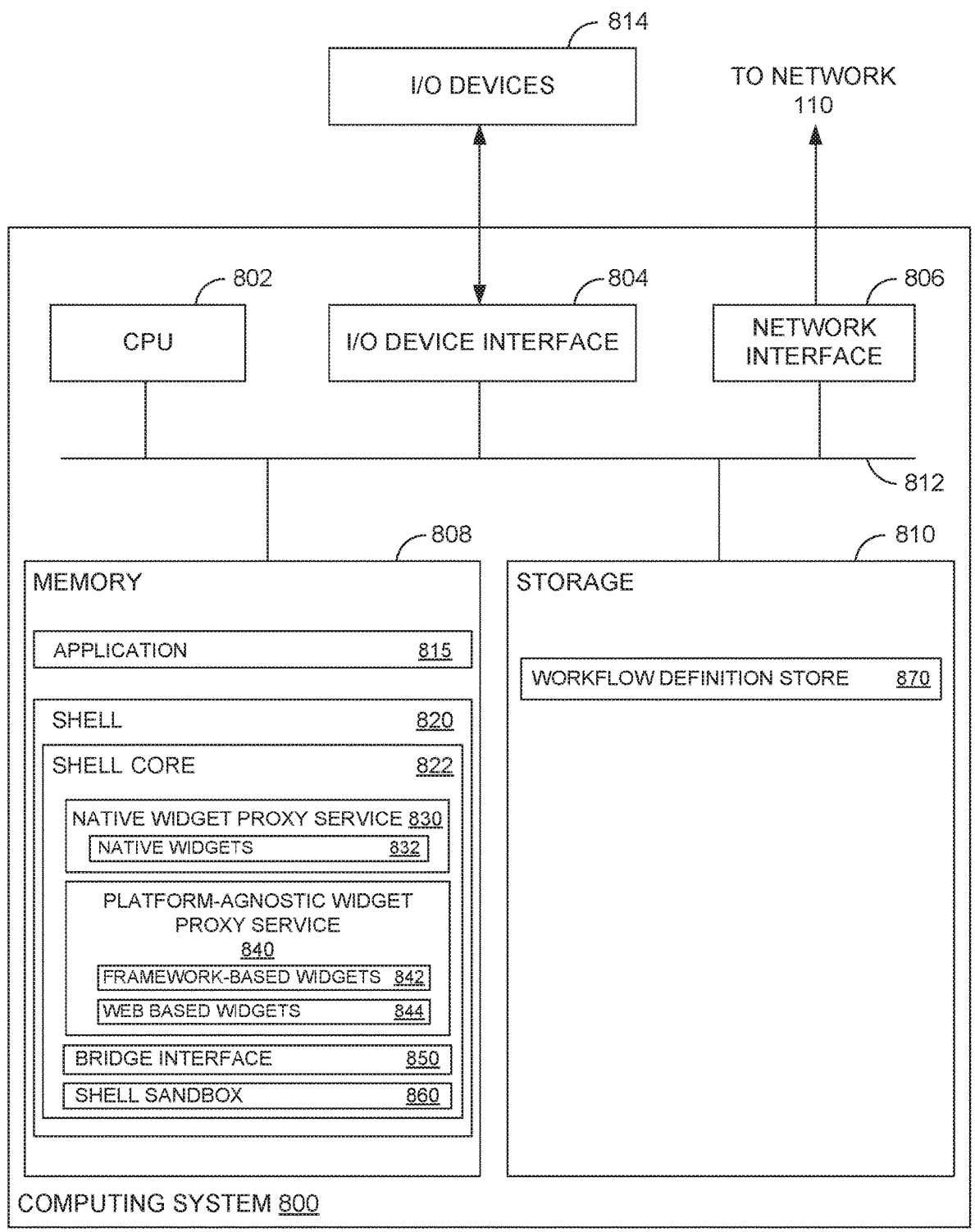
FIG. 8 illustrates an exemplary computing system for deploying cross-platform applications on a client device while maintaining a consistent user experience across platforms, according to one embodiment.

FIG. 8 illustrates an exemplary computing system for deploying cross-platform applications on a client device while maintaining a consistent user experience across platforms, according to one embodiment. As shown, the system 800 includes a central processing unit (CPU) 802, one or more I/O device interfaces 804 which may allow for the connection of various I/O devices 814 (e.g., keyboards, displays, mouse devices, pen input, etc.) to the system 800, network interface 806, a memory 808, storage 810, and an interconnect 812.

CPU 802 may retrieve and execute programming instructions stored in the memory 808. Similarly, the CPU 802 may retrieve and store application data residing in the memory 808. The interconnect 812 transmits programming instructions and application data, among the CPU 802, I/O device interface 804, network interface 806, memory 808, and storage 810. CPU 802 is included to be representative of a single CPU, multiple CPUs, a single CPU having multiple processing cores, and the like. Additionally, the memory 808 is included to be representative of a random access memory. Furthermore, the storage 810 may be, for example, a disk drive, solid-state drive, or a collection of storage devices distributed across multiple storage systems. Although shown as a single unit, the storage 810 may be a combination of fixed and/or removable storage devices, such as fixed disc drives, removable memory cards or optical storage, network attached storage (NAS), or a storage area-network (SAN).

As shown, memory 808 includes an application 815 and a shell 820. As illustrated, the shell 820 includes a shell core 822 including a native widget proxy service 830, a platform-agnostic widget proxy service 840, a bridge interface 850, and a shell sandbox 860. A widget may define a collection of user interface components to be rendered on a device to complete a workflow step or to enable a user to input data into the application 815. The native widget proxy service 830 may include one or more native widgets 832. The platform-agnostic widget proxy service 840 may provide a runtime environment (not shown) in which one or more framework-based widgets 842 and one or more web-based widgets 844 may execute.

The shell 820 may execute within an inline frame of a web page provided by the application 815.

The bridge interface 850 provides an interface between the application 815 and the shell core 822. The bridge interface 450 federates communications between the application 815 and widgets loaded in the shell core 400 (e.g., native widgets 832, framework-based widgets 842, web-based widgets 844). All communications to and from a cross-platform widget may be routed through the bridge interface 450. Thus, the bridge interface 450 may monitor and track all widget-to-widget communication as well as widget-to-application and application-to-widget communication.

The shell sandbox 860 may provide common services to native and cross-platform widgets. The common services may include activity logging, analytics, application context tracking, authentication, and the like. All communications to and from a widget may be routed to the shell sandbox 860. The shell sandbox 860 may route the each communication to a corresponding destination.

The shell sandbox 860 may also load and unload widgets (e.g., native widgets 832, framework-based widgets 842, and web-based widgets 844) from the shell core 822. To load a cross-platform widget (e.g., a framework-based widget 842 or a web-based widget 844), the shell core 822 may create a platform-agnostic widget proxy service in which the widget is loaded. The platform-agnostic widget proxy service may provide a runtime environment in which the cross-platform widget executes.

As shown, storage 810 includes a workflow definition store 870. The workflow definition store 870 may store one or more workflow definitions provided by the application 815. A given workflow may specify one or more widgets to be loaded into the shell core 822.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments, and advantages discussed herein are merely illustrative and are not considered elements or limitations of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A system comprising:
a processor; and
a memory comprising executable instructions, which, when executed by the processor, cause the system to:
receive, from an application server, a workflow definition specifying one or more widgets to be loaded into a shell executing within a given application, the shell comprising a runtime environment, the one or more widgets comprising at least a first cross-platform widget;
obtain, from the application server, the first cross-platform widget;
instantiate the runtime environment for the first cross-platform widget, the runtime environment including a bridge interface for facilitating communications between each widget in the one or more widgets and the given application, wherein the given application runs outside of the shell;
load the first cross-platform widget into the runtime environment; process, through the bridge interface, a first communication to the first cross-platform widget running within the shell from the given application, wherein the first communication specifies a function to be invoked at the first cross-platform widget;
transmit, by the bridge interface, parameters for executing the function at the first cross-platform widget based on the first communication;
process, through the bridge interface, a second communication from the first cross-platform widget running within the shell wherein the second communication comprises a result of executing the function;
determine, by the bridge interface, that a condition has been satisfied based on the second communication; and
transmit, by the bridge interface, a message to the given application based on the condition being satisfied.

2. The system of claim 1, the memory further comprising executable instructions, which, when executed by the processor, cause the system to:
receive, from the first cross-platform widget, an additional message to transmit to the application server, the additional message including the data in the communication and an indication of a function to be invoked at the application server; and
transmit the additional message to the application server.

3. The system of claim 1, the memory further comprising executable instructions, which, when executed by the processor, cause the system to:
receive, from the application server, a second workflow definition identifying a second cross-platform widget to be loaded into the runtime environment;
determine that the second cross-platform widget is different than the first cross-platform widget;
unload the first cross-platform widget from the runtime environment;
load the second cross-platform widget into the runtime environment; and
expose functionality of the second cross-platform widget to the given application.

4. The system of claim 3, wherein the function comprises a transition by the given application from the first cross-platform widget to the second cross-platform widget.

5. The system of claim 1, wherein the first communication comprises a message to invoke the function at the given application and data from the first cross-platform widget.

6. A non-transitory computer-readable storage medium storing instructions, which, when executed on a processor of a computing system, causes the computing system to perform an operation, the operation comprising:
receiving, from an application server, a workflow definition specifying one or more widgets to be loaded into a shell executing within a given application, the shell comprising a runtime environment, the one or more widgets comprising at least a first cross-platform widget;
obtaining, from the application server, the first cross-platform widget;
instantiating the runtime environment for the first cross-platform widget, the runtime environment including a bridge interface for facilitating communications between each widget in the one or more widgets and the given application, wherein the given application runs outside of the shell;
loading the first cross-platform widget into the runtime environment;

processing, through the bridge interface, a first communication to the first cross-platform widget running within the shell from the given application, wherein the first communication specifies a function to be invoked at the first cross-platform widget;

transmitting, by the bridge interface, parameters for executing the function at the first cross-platform widget based on the first communication;

processing, through the bridge interface, a second communication from the first cross-platform widget running within the shell, wherein the second communication comprises a result of executing the function;

determining, by the bridge interface, that a condition has been satisfied based on the second communication; and transmitting, by the bridge interface, a message to the given application based on the condition being satisfied.

7. The non-transitory computer-readable storage medium of claim 6, the operation further comprising:

receiving, from the first cross-platform widget, an additional message to transmit to the application server, the additional message including the data in the communication and an indication of a function to be invoked at the application server; and transmitting the additional message to the application server.

8. The non-transitory computer-readable storage medium of claim 6, the operation further comprising:

receiving, from the application server, a second workflow definition identifying a second cross-platform widget to be loaded into the runtime environment;

determining that the second cross-platform widget is different than the first cross-platform widget;

unloading the first cross-platform widget from the runtime environment;

loading the second cross-platform widget into the runtime environment; and exposing functionality of the second cross-platform widget to the given application.

9. The non-transitory computer-readable storage medium of claim 8, wherein the function comprises a transition by the given application from the first cross-platform widget to the second cross-platform widget.

10. The non-transitory computer-readable storage medium of claim 6, wherein the first communication comprises a message to invoke the function at the given application and data from the first cross-platform widget.

11. A method, comprising:

receiving, from an application server, a workflow definition specifying one or more widgets to be loaded into a shell executing within a given application, the shell comprising a runtime environment, the one or more widgets comprising at least a first cross-platform widget;

obtaining, from the application server, the first cross-platform widget;

instantiating the runtime environment for the first cross-platform widget, the runtime environment including a bridge interface for facilitating communications between each widget in the one or more widgets and the given application, wherein the given application runs outside of the shell;

loading the first cross-platform widget into the runtime environment;

processing, through the bridge interface, a first communication to the first cross-platform widget running within the shell from the given application, wherein the first communication specifies a function to be invoked at the first cross-platform widget;

transmitting, by the bridge interface, parameters for executing the function at the first cross-platform widget based on the first communication;

processing, through the bridge interface, a second communication from the first cross-platform widget running within the shell, wherein the second communication comprises a result of executing the function;

determining, by the bridge interface, that a condition has been satisfied based on the condition being satisfied.

12. The method of claim 11, further comprising:

receiving, from the first cross-platform widget, an additional message to transmit to the application server, the additional message including the data in the communication and an indication of a function to be invoked at the application server; and transmitting the additional message to the application server.

13. The method of claim 12, further comprising:

receiving, from the application server, instructions to update data displayed by the first cross-platform widget on a client device and new data to display by the first cross-platform widget; and updating the data displayed by the first cross-platform widget to include the new data.

14. The method of claim 11, further comprising:

receiving, from the application server, a second workflow definition identifying a second cross-platform widget to be loaded into the runtime environment;

determining that the second cross-platform widget is different than the first cross-platform widget;

unloading the first cross-platform widget from the runtime environment;

loading the second cross-platform widget into the runtime environment; and exposing functionality of the second cross-platform widget to the given application.

15. The method of claim 14, wherein the function comprises a transition by the given application from the first cross-platform widget to the second cross-platform widget.

16. The method of claim 11, wherein the communication comprises a message to invoke the function at the given application and data from the first cross-platform widget.

17. The method of claim 11, wherein the runtime environment executes in a first inline frame of a web page and the given application executes in a second inline frame of the web page.

* * * * *